United States Patent
Bergman et al.

(10) Patent No.: US 7,924,754 B2
(45) Date of Patent: Apr. 12, 2011

(54) MULTIPLE CARRIER ACKNOWLEDGMENT SIGNALING

(75) Inventors: Johan Bergman, Stockholm (SE); Yi-Pin Eric Wang, Cary, NC (US); Erik Larsson, Uppsala (SE)

(73) Assignee: Telefonaktiebolaget L M Ericsson, (publ) Stockholm (SE)

( * ) Notice: Subject to any disclaimer, the term of this patent is extended or adjusted under 35 U.S.C. 154(b) by 141 days.

(21) Appl. No.: 12/502,506

(22) Filed: Jul. 14, 2009

(65) Prior Publication Data

US 2010/0074120 A1 Mar. 25, 2010

Related U.S. Application Data (60) Provisional application No. 61/099,341, filed on Sep. 23, 2008, provisional application No. 61/101,288, filed on Sep. 30, 2008.

(51) Int. Cl.
*H04B 7/00* (2006.01)

(52) U.S. Cl. ........................ 370/310

(58) Field of Classification Search ........ 370/310, 370/328, 335–338, 342–345; 375/130–134, 375/240

See application file for complete search history.

(56) References Cited

U.S. PATENT DOCUMENTS

| | | | | |
|---|---|---|---|---|
| 7,499,474 | B2* | 3/2009 | Derryberry et al. | 370/538 |
| 7,864,738 | B2* | 1/2011 | Kaikkonen et al. | 370/334 |
| 2008/0086669 | A1* | 4/2008 | Cheng et al. | 714/748 |
| 2009/0129317 | A1* | 5/2009 | Che et al. | 370/328 |
| 2009/0141690 | A1* | 6/2009 | Fan et al. | 370/335 |
| 2009/0245212 | A1* | 10/2009 | Sambhwani et al. | 370/336 |

OTHER PUBLICATIONS

3GPP ETSI TS 125 212 V7.8.0 (Jul. 2008) Universal Mobile Telecommunications System (UMTS); Multiplexing and channel coding (FDD) (3GPP TS 25.212 version 7.8.0 Release 7). Sophia Antipolis Cedex, France. Jul. 2008 (Jul. 1, 2008).
"Single Code HS-DPCCH CQI Design for DC-HSDPA"; R1-083540; 3GPP TSG-RAN WG1 #54-bis; Sep. 28-Oct. 3, 2008: Prague, Czech Republic.
"On the HS-DPCCH structure for Dual-Cell HSDPA operation"; R1-083592; 3GPP TSG RAN WG1 Meeting #54bis; Prague, Czech Republic, Sep. 29-Oct. 3, 2008.
"Single Code HS-DPCCH ACK/NACK Design for DC-HSDPA"; R1-083961; 3GPP TSG-RAN WG1 #54-bis; Sep. 28-Oct. 3, 2008; Prague, Czech Republic.
"On the HS-DPCCH structure for Dual-Cell HSDPA operation" R1-083975; 3GPP TSG RAN WG1 Meeting #54bis; Prague, Czech Republic, Sep. 29-Oct. 3, 2008.

* cited by examiner

*Primary Examiner* — Dmitry H Levitan (57) ABSTRACT

Acknowledgment signaling in a multiple carrier environment is enabled with a multiple carrier codebook having code words that jointly encode acknowledgment for at least two carriers. For an example embodiment, there is a method in a remote terminal for acknowledgment uplink signaling in a multiple-carrier mode. First, a code word is determined that jointly encodes acknowledgment signaling for at least two carriers from a multiple carrier codebook that is stored in the remote terminal. The multiple carrier codebook includes eight code words that are defined to have a single carrier codebook as a sub-codebook of the multiple carrier codebook, each code word of the eight code words having a length of ten. The multiple carrier codebook achieves a minimum Hamming distance of four among the eight code words. Second, an uplink signaling message that includes the determined code word is transmitted from the remote terminal to a wireless network node.

26 Claims, 6 Drawing Sheets

MULTIPLE CARRIER ACKNOWLEDGMENT SIGNALING

CROSS-REFERENCES TO RELATED APPLICATIONS

This U.S. Nonprovisional Patent Application claims the benefit of U.S. Provisional Patent Application No. 61/099,341, filed 23 Sep. 2008, and U.S. Provisional Patent Application No. 61/101,288, filed 30 Sep. 2008. U.S. Provisional Patent Application Nos. 61/099,341 and 61/101,288 are hereby incorporated by reference in their entirety herein.

TECHNICAL FIELD

The present invention relates generally to the communications arts, and more specifically by way of example but not limitation, to acknowledgment signaling in a multiple carrier environment.

BACKGROUND

Many specialized terms and abbreviations are used in the communications arts. At least some of the following are referred to within the text that follows, such as in this background and/or the subsequent description sections. Thus, the following terms and abbreviations are herewith defined:
  3GPP $3^{rd}$ Generation Partnership Project
  ACK Acknowledgment
  ARQ Automatic Retransmission reQuest
  CQI Channel Quality Indicator
  DC-HSDPA Dual Carrier/Dual Cell HSDPA
  DTX Discontinuous Transmission
  HARQ Hybrid Automatic Retransmission reQuest
  HSDPA High-Speed Downlink Packet Access
  HS-DPCCH High-Speed Dedicated Physical Control Channel (in WCDMA)
  HS-DSCH High-Speed Downlink Shared Channel
  HSPA High Speed Packet Access
  HS-SCCH High-Speed Shared Control Channel
  MC-HSDPA Multiple Carrier/Multiple Cell HSDPA
  MIMO Multiple Input, Multiple Output
  NACK Negative Acknowledgment
  POST ack/nack POSTamble
  PRE ack/nack PREamble
  WCDMA Wideband Code Division Multiple Access Electronic communication forms the backbone of today's information-oriented society. Electronic communications are transmitted over wireless or wired channels using electromagnetic radiation, such as radio frequency (RF) transmissions, light waves, and so forth. The accessibility and capacity of electronic communications is frequently limited by the bandwidth of a communications channel between a first (e.g., transmitting) device and a second (e.g., receiving) device.

The available bandwidth of a communications channel may be increased by adopting any of a number of different schemes. One such example scheme is communicating over multiple carriers. Multiple carrier operations may include multiple cell operations. High speed packet access (HSPA), including high-speed downlink packet access (HSDPA), is currently being evolved to include multi-carrier and/or multi-cell operations. An initial step is to support dual-carrier and/or dual-cell (DC) HSDPA operations (DC-HSDPA). With DC-HSDPA, a user can receive from two carriers "simultaneously." This increases high-data-rate coverage.

With some communication systems, such as those implemented in accordance with Wideband Code Division Multiple Access (WCDMA), communications between a sender and a receiver are performed with Automatic Retransmission reQuest (ARQ) or Hybrid ARQ (HARQ) operations. Thus, to support DC-HSDPA, an affirmative acknowledgement (ACK) or a negative acknowledgement (NACK) is used to support the HARQ operation on each of the two carriers. A number of proposals have been made to support the HARQ operations on each of two carriers.

A first proposal entails signaling the two ACK/NACK indications (one per carrier) using separate High-Speed Dedicated Physical Control Channels (HS-DPCCHs). However, it has been noted that such an approach has a severe coverage impact when both HS-DPCCHs are transmitted. Furthermore, when the second HS-DPCCH is transmitted alone, the cubic metric is slightly larger than when the first HS-DPCCH is transmitted alone. This results in worse coverage when a mobile needs to ACK/NACK the second carrier alone, as compared to when it needs to ACK/NACK the first carrier alone.

A second proposal generally entails signaling the two ACK/NACK indications using joint coding and one HS-DPCCH. In this approach, the two ACK/NACK messages are jointly encode and transmitted using one HS-DPCCH. There are eight (8) jointly-encoded messages to indicate the dual ACK/NACK conditions:
  ACK (carrier 1) & ACK (carrier 2)
  ACK (carrier 1) & NACK (carrier 2)
  ACK (carrier 1) & DTX (carrier 2)
  NACK (carrier 1) & ACK (carrier 2)
  NACK (carrier 1) & NACK (carrier 2)
  NACK (carrier 1) & DTX (carrier 2)
  DTX (carrier 1) & ACK (carrier 2)
  DTX (carrier 1) & NACK (carrier 2)
In the case of "DTX (carrier 1) and DTX (carrier 2)", a mobile does not need to transmit any ACK/NACK signaling.

One specific proposal for joint encoding is to reuse the existing eight (8) MIMO ACK/NACK/PRE/POST code words that are specified in 3GPP TS 25.212 Table 15B. One example codebook in accordance with this specific proposal is given below:
  ACK/DTX=[1 1 1 1 1 1 1 1 1 1]
  NACK/DTX=[0 0 0 0 0 0 0 0 0 0]
  DTX/ACK=[1 0 1 0 1 1 1 1 0 1]
  DTX/NACK=[1 1 0 1 0 1 0 1 1 1]
  ACK/ACK=[0 1 1 1 1 0 1 0 1 1]
  ACK/NACK=[1 0 0 1 0 0 1 0 0 0]
  NACK/ACK=[0 0 1 0 0 1 0 0 1 0]
  NACK/NACK=[0 1 0 0 1 0 0 1 0 0].

Unfortunately, there are deficiencies in the existing proposals for supporting DC-HSDPA. As noted above, the former proposal with two separate ACK/NACK indications results in a severe coverage impact when both HS-DPCCHs are transmitted. The latter proposal results in a different set of deficiencies, which are described herein below.

Consequently, there is a need to address the deficiencies that exist in the current state of the art with regard to supporting multiple carrier and/or multiple cell communications (e.g., DC-HSDPA). Such deficiencies and other needs are addressed by one or more of the various embodiments of the present invention.

SUMMARY

It is an object of the present invention to remedy or at least ameliorate one or more of the deficiencies that are identified herein above and further below. It is an object of certain embodiments of the present invention to achieve an enhanced minimum Hamming distance for a codebook having code words that jointly encode ACK/NACK signaling for multiple carriers. It is another object of certain embodiments of the present invention to support PRE and POST operations with such a codebook.

In an example embodiment, there is a method in a remote terminal for acknowledgment uplink signaling in a multiple-carrier mode. First, a code word is determined that jointly encodes acknowledgment signaling for at least two carriers from a multiple carrier codebook that is stored in at least one memory of the remote terminal. The multiple carrier codebook includes eight code words that are defined to have a single carrier codebook as a sub-codebook of the multiple carrier codebook, with each code word of the eight code words having a length of ten. The multiple carrier codebook achieves a minimum Hamming distance of four among the eight code words. Second, an uplink signaling message that includes the determined code word is transmitted from the remote terminal to a wireless network node.

In another example embodiment, there is a method in a wireless network node for acknowledgment uplink signaling in a multiple-carrier mode. First, an uplink signaling message that includes a code word that jointly encodes acknowledgment signaling for at least two carriers is received from a remote terminal at the wireless network node. Second, the code word is decoded using a multiple carrier codebook that is stored in at least one memory of the wireless network node. The multiple carrier codebook includes eight code words that are defined to have a single carrier codebook as a sub-codebook of the multiple carrier codebook, with each code word of the eight code words having a length of ten. The multiple carrier codebook achieves a minimum Hamming distance of four among the eight code words.

In yet another example embodiment, there is a remote terminal that is adapted to perform acknowledgment uplink signaling in a multiple-carrier mode. The remote terminal includes at least one memory storing a multiple carrier codebook and one or more processors. The multiple carrier codebook includes eight code words that are defined to have a single carrier codebook as a sub-codebook of the multiple carrier codebook, with each code word of the eight code words having a length of ten. The multiple carrier codebook achieves a minimum Hamming distance of four among the eight code words. The one or more processors are configured: to determine a code word that jointly encodes acknowledgment signaling for at least two carriers from the multiple carrier codebook and to transmit from the remote terminal to a wireless network node an uplink signaling message that includes the determined code word.

In still yet another example embodiment, there is a wireless network node that is adapted to perform acknowledgment uplink signaling in a multiple-carrier mode. The wireless network node includes at least one memory storing a multiple carrier codebook and one or more processors. The multiple carrier codebook includes eight code words that are defined to have a single carrier codebook as a sub-codebook of the multiple carrier codebook, with each code word of the eight code words having a length of ten. The multiple carrier codebook achieves a minimum Hamming distance of four among the eight code words. The one or more processors are configured: to receive from a remote terminal at the wireless network node an uplink signaling message that includes a code word that jointly encodes acknowledgment signaling for at least two carriers and to decode the code word using a multiple carrier codebook.

An advantage of certain embodiments of the present invention is that an enhanced minimum Hamming distance may be achieved for a codebook having code words that jointly encode ACK/NACK signaling for multiple carriers. Another advantage of certain embodiments of the present invention is that PRE and POST operations may be supported. Yet another advantage of certain embodiments of the present invention is that codebook ambiguity may be avoided when there is a misunderstanding between a remote terminal and a wireless network node regarding whether a single carrier mode or a multiple carrier mode is active. Still yet another advantage of certain embodiments of the present invention is that a maximum possible code word separation may be achieved for messages having opposite acknowledgment meanings. Other advantages are noted herein below.

Additional embodiments are also described and/or claimed herein. Example additional embodiments include, by way of example but not limitation, arrangements, memories, devices, systems, and so forth. Additional aspects of the invention are set forth in part in the detailed description, drawings, and claims that follow, and in part may be derived from the detailed description and drawings, or can be learned by practice of the invention. It is to be understood that both the foregoing general description and the following detailed description are exemplary and explanatory only and are not restrictive of the invention as disclosed or as claimed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

As described herein above, there are drawbacks to the existing approaches to supporting multiple carrier and/or multiple cell communications (e.g., DC-HSDPA). The first existing proposal would use two separate ACK/NACK indications. It would result in a severe coverage impact when both HS-DPCCHs are transmitted. The second existing proposal would reuse the existing eight (8) MIMO ACK/NACK/PRE/POST code words that are already specified in 3GPP.

Although reusing the existing eight MIMO code words can jointly encode two ACK/NACK indications to thereby avoid necessitating separate transmissions for dual carrier ACK/NACK signaling, a different set of deficiencies is introduced with this proposal. For example, such a codebook formed from the existing eight MIMO code words has a minimum Hamming distance of only 3, which is far less than the optimal minimum Hamming distance for a codebook of length 10 and size 8. Also, the PRE and POST operations cannot be supported because the MIMO-derived code words 7 and 8 ("NACK/ACK=[0 0 1 0 0 1 0 0 1 0]" and "NACK/NACK=[0 1 0 0 1 0 0 1 0 0]") have the same values as do the existing PRE and POST indications.

In contrast, example codebook embodiments that are described herein below have superior minimum Hamming distances. Two different example multiple carrier codebook embodiments are set forth below. A first example multiple carrier codebook embodiment has a minimum Hamming distance of 5, and a second example multiple carrier codebook embodiment has a minimum Hamming distance of 4. Both example multiple carrier codebook embodiments are capable of being configured to support PRE and POST operations. The second example multiple carrier codebook embodiment may also include, as a sub-codebook or subset thereof, a single carrier ACK/NACK signaling codebook. The second example multiple carrier codebook embodiment may further ensure that code word pairs having code words with opposite meanings have a relatively large Hamming distance separation between them. In an example implementation, the first and second example multiple carrier codebook embodiments may entail a codebook that supports ACK/NACK signaling using one HS-DPCCH for the DC-HSDPA operation in a WCDMA-based communications system.

In addition to HARQ ACK/NACK signaling, two CQIs may be signaled during DC-HSDPA operations. An analogous problem can arise with respect to CQI when an HS-SCCH order deactivating the DC-HSDPA operation is not detected by a remote terminal. This can create a CQI codebook ambiguity between a wireless network node and the remote terminal. Example embodiments addressing this problem are also described herein below.

When a MIMO-style HS-DPCCH format is used for DC-HSDPA, integrating the DC-HSDPA feature and the MIMO HSDPA feature can be problematic. Example embodiment(s) enabling the DC-HSDPA feature and the MIMO HSDPA feature to be combined are also described herein below.

Figure 1:
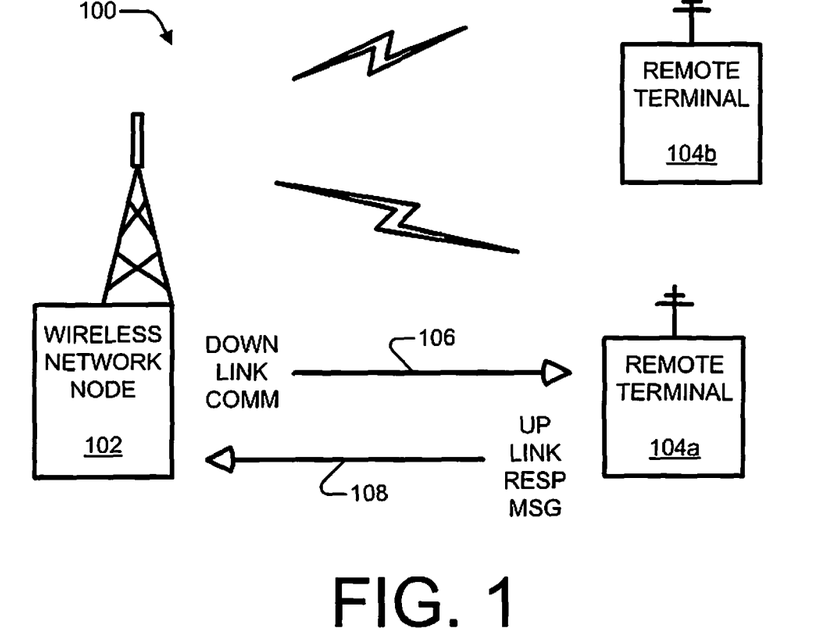
FIG. 1 is a block diagram of an example communications system including a wireless network node and multiple remote terminals.

FIG. 1 is a block diagram of an example communications system 100 including a wireless network node 102 and multiple remote terminals 104. Thus, as illustrated, communications system 100 includes at least one wireless network node 102 and one or more remote terminals 104a and 104b. Although only two remote terminals 104a and 104b are explicitly shown, wireless network node 102 may be in communication with fewer or more than two such remote terminals 104. Similarly, although only one wireless network node 102 is illustrated in FIG. 1, each given remote terminal 104 may be in communication with multiple such wireless network nodes 102 (e.g., in a multiple-cell mode). Alternatively, wireless network node 102 may be a wired network node that communicates with remote terminal(s) 104 over a wireline connection.

Communications from wireless network node 102 to a remote terminal 104 are usually termed downlink communications. Communications from a remote terminal 104 to wireless network node 102 are usually termed uplink communications. In an example embodiment, a downlink communication 106 is transmitted from wireless network node 102 to remote terminal 104a. Remote terminal 104a receives downlink communication 106 and processes it.

In response to receiving downlink communication 106 and/or based on the processing thereof, remote terminal 104a formulates an uplink response message 108. As described herein below, uplink response message 108 may include at least one code word. Remote terminal 104a transmits uplink response message 108 to wireless network node 102. Wireless network node 102 may process uplink response message 108 appropriately, such as by decoding the included code word(s).

In the context of certain example embodiments as described herein, uplink response message 108 indicates a reception condition with regard to one or more downlink communications 106. The reception condition may be indicated with one or more included code words. An indicated reception condition may be, for example, an affirmative acknowledgment, a negative acknowledgment, no reception, a preamble operation, a postamble operation, some combination thereof, and so forth. Different reception conditions are described further herein below with particular reference to FIG. 2.

Wireless network nodes 102 may comprise, for example, a base station, a base transceiver station, a radio base station, a Node B, an access point, some combination thereof, and so forth. Remote terminals 104 may comprise, for example, a mobile terminal, a mobile station, a user equipment, a subscriber station, a communication card or module, some combination thereof, and so forth. General example device implementations for wireless network nodes 102 and/or remote terminals 104 are described herein below with particular reference to FIG. 7.

Certain example technology that is referred to herein is expressed using WCDMA terminology. However, it should be understood that this is merely one example implementation that may be appropriate for a WCDMA-based system. In other words, remote terminals may be of any general type, and network nodes may be a part of the infrastructure of any general wireless (or wired) network. In wireless implementations, other air interface technologies (e.g., that comport with a different wireless network standard) may be utilized to implement the principles of the present invention. Such other wireless network standards may or may not be directed to a cellular-type wireless network.

Figure 2:
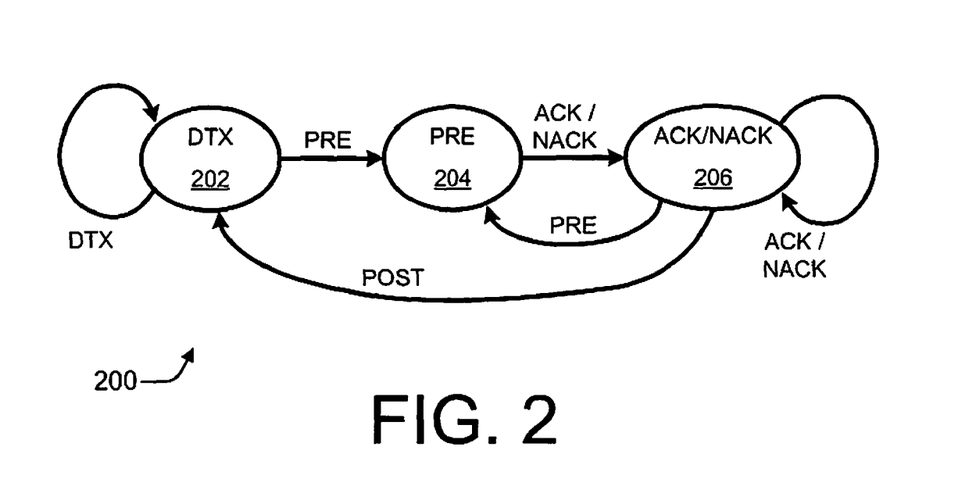
FIG. 2 is an example state diagram for extended ACK/NACK signaling that includes PRE and POST operations.

FIG. 2 is an example state diagram 200 for extended ACK/NACK signaling that includes PRE and POST operations. As illustrated, state diagram 200 includes three states: a discontinuous transmission (DTX) state 202, a preamble (PRE) state 204, and an ACK/NACK state 206. PRE and POST operations are introduced to improve ACK/NACK detection performance. As illustrated in state diagram 200, a trellis structure is added to the ACK/NACK signaling channel.

When a remote terminal detects the High-Speed Shared Control Channel (HS-SCCH) for subframe n, it sends a preamble "PRE" indication in the HS-DPCCH in subframe n−1 to transition from DTX state 202 to PRE state 204. If the remote terminal does not detect a High-Speed Downlink Shared Channel (HS-DSCH) in subframe n after receiving a HS-DSCH in subframe n−1, it sends a post-amble "POST" indication in subframe n to transition from ACK/NACK state 206 to DTX state 202. The use of preamble and postamble indications enables a wireless network node to better differentiate DTX from bursty ACK/NACK transmissions.

Figure 3:
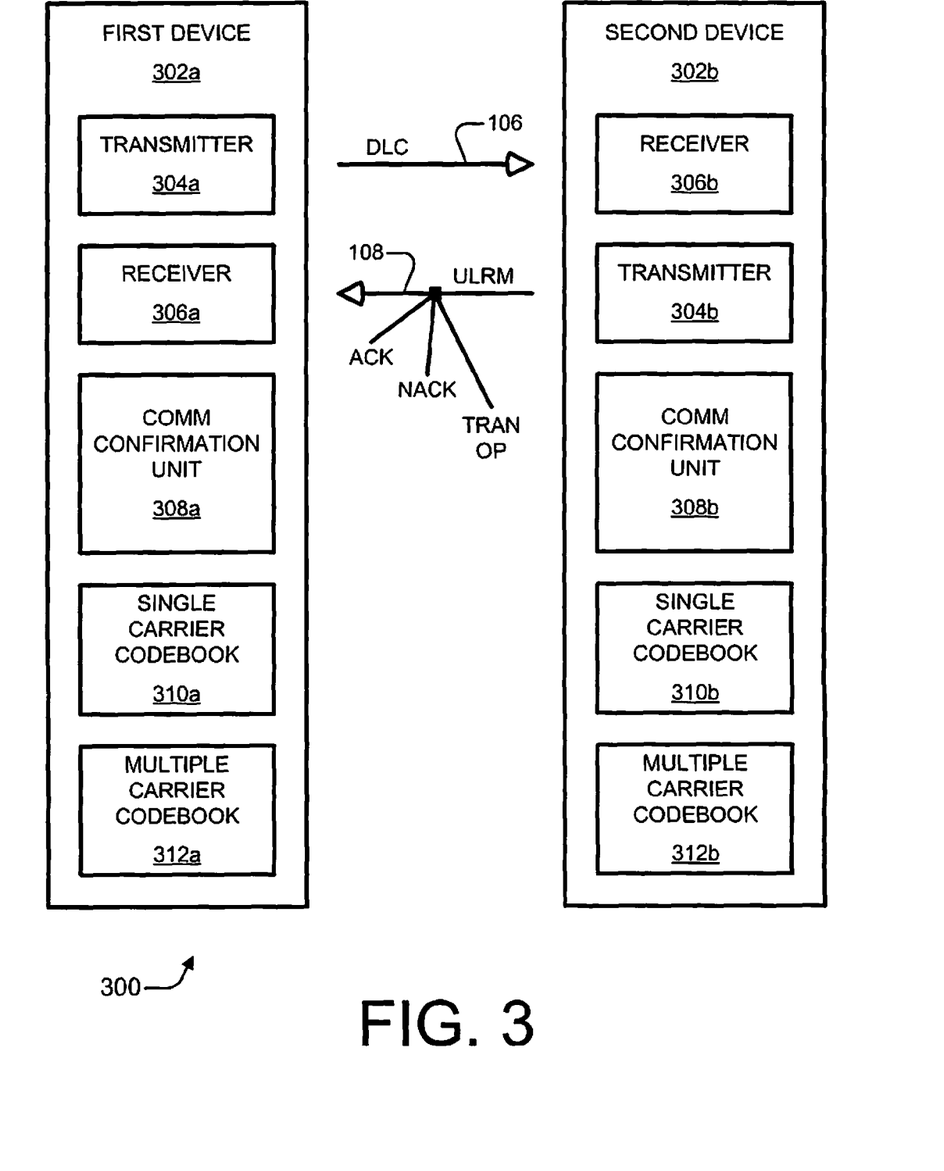
FIG. 3 is a block diagram of example devices that are configured to communicate using a multiple carrier codebook in accordance with embodiments of the present invention.

FIG. 3 is a block diagram 300 of example devices 302 that are configured to communicate using a multiple carrier codebook 312 in accordance with embodiments of the present invention. As illustrated, devices 302 include a transmitter 304, a receiver 306, a communication confirmation unit 308, a single carrier codebook 310, and a multiple carrier codebook 312. More specifically, a first device 302a includes a transmitter 304a, a receiver 306a, a communication confirmation unit 308a, a single carrier codebook 310a, and a multiple carrier codebook 312a. A second device 302b includes a receiver 306b, a transmitter 304b, a communication confirmation unit 308b, a single carrier codebook 310b, and a multiple carrier codebook 312b. Each of devices 302a and 302b may include more or fewer components than those that are illustrated.

In an example embodiment, first device 302a is functioning as a wireless network node 102 (of FIG. 1), and second device 302b is functioning as a remote terminal 104, such as remote terminal 104a. Hence, first device 302a uses transmitter 304a to transmit a downlink communication 106 to second device 302b, which is received with receiver 306b. Second device 302b uses transmitter 304b to transmit an uplink response message 108 to first device 302a, which is received with receiver 306a. Uplink response message 108 may include at least one ACK indication, at least one NACK indication, or at least one transitional operation indication for one or more carriers. If second device 302b miss detects the presence of downlink communication 106, it will not transmit an uplink response message 108. Such cases, for example, are referred to herein as DTX.

In an example implementation, these indications may be communicated using at least one code word from one or more codebooks. When devices 302 are communicating over a single carrier, they may determine and decode/interpret code words using single carrier codebook 310. When devices 302 are communicating over multiple carriers, they may determine and decode/interpret code words using multiple carrier codebook 312. An example multiple carrier codebook 312 that pertains to at least two carriers/cells is described below with particular reference to FIG. 4. The code word determination is performed by communication confirmation unit 308b of second device 302b, and the code word decoding is performed by communication confirmation unit 308a of first device 302a.

Figure 4:
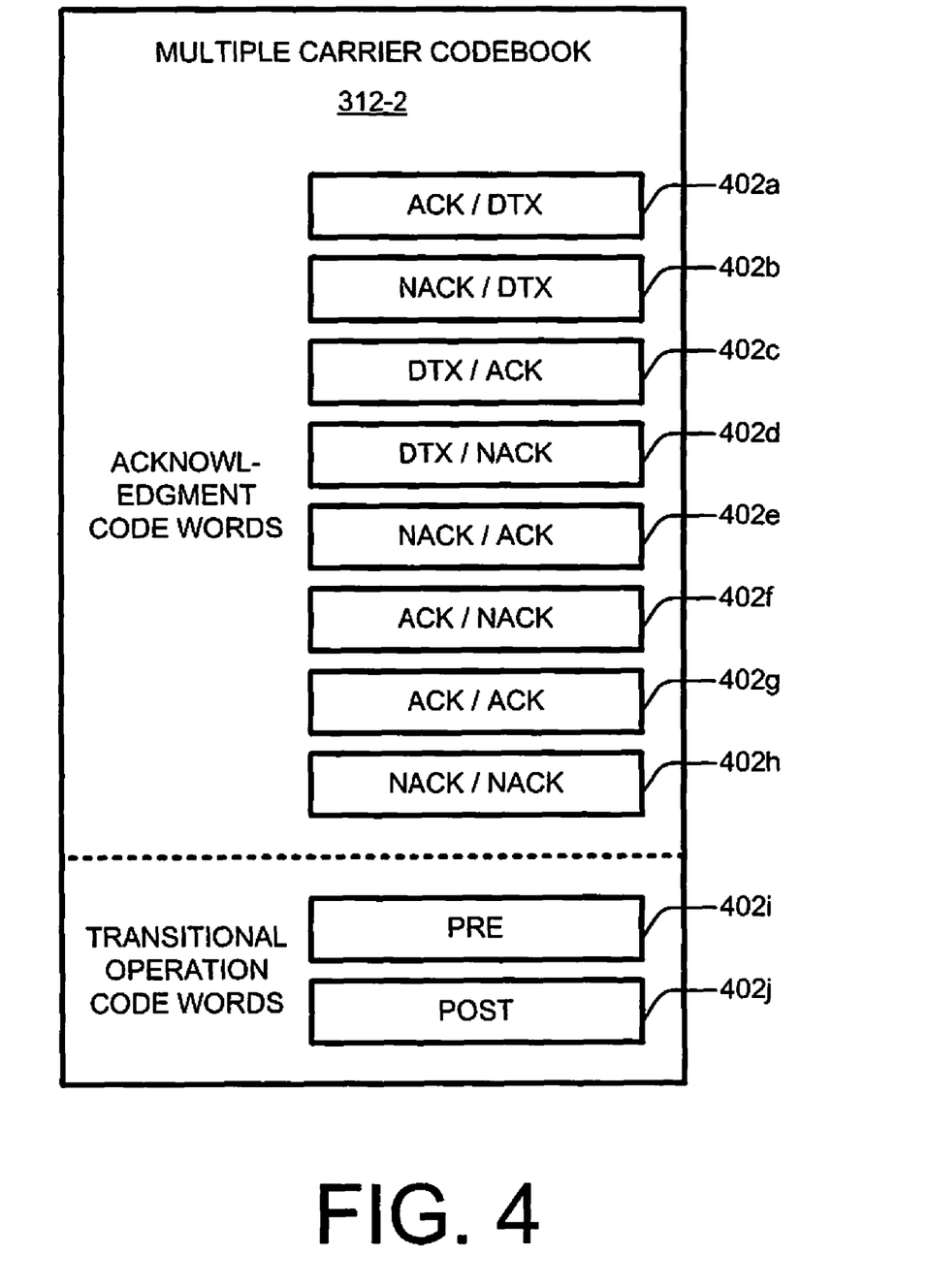
FIG. 4 is a block diagram of an example multiple carrier codebook.

FIG. 4 is a block diagram of an example multiple carrier codebook 312. As illustrated, multiple carrier codebook 312 comprises an example dual carrier codebook 312-2. For an example embodiment, dual carrier codebook 312-2 includes ten total code words 402. It includes eight "acknowledgment" code words 402a-h. Dual carrier codebook 312-2 may also include two "transitional operation" code words 402i and 402j. However, a dual carrier codebook 312-2 may alternatively include a different number of code words and/or a set of code words that have different meanings.

Example reception condition meanings for the set of code words 402 for dual carrier codebook 312-2 are provided below. Code word 402a indicates an "ACK/DTX" reception condition, which corresponds to an affirmative acknowledgment (e.g., for a transport block that is received) on a first carrier and no reception (e.g., of a transport block) on a second carrier. Code word 402b indicates a "NACK/DTX" reception condition, which corresponds to a negative acknowledgment (e.g., for a transport block that is not received correctly) on a first carrier and no reception on a second carrier. Code word 402c indicates a "DTX/ACK" reception condition, which corresponds to no reception on a first carrier and an affirmative acknowledgment on a second carrier. Code word 402d indicates a "DTX/NACK" reception condition, which corresponds to no reception on a first carrier and a negative acknowledgment on a second carrier.

Code word 402e indicates a "NACK/ACK" reception condition, which corresponds to a negative acknowledgment on a first carrier and an affirmative acknowledgment on a second carrier. Code word 402f indicates an "ACK/NACK" reception condition, which corresponds to an affirmative acknowledgment on a first carrier and a negative acknowledgment on a second carrier. Code word 402g indicates an "ACK/ACK" reception condition, which corresponds to an affirmative acknowledgment on a first carrier and an affirmative acknowledgment on a second carrier. Code word 402h indicates a "NACK/NACK" reception condition, which corresponds to a negative acknowledgment on a first carrier and a negative acknowledgment on a second carrier.

As noted above, a multiple carrier codebook 312 such as dual carrier codebook 312-2 may also include code words for transitional operations. Code word 402i indicates a reception condition for a "PRE" operation, which corresponds to a preamble transition operation. Code word 402j indicates a reception condition for a "POST" operation, which corresponds to a postamble transition operation.

The values placed on these code words can create different multiple carrier codebooks 312. Different multiple carrier codebooks 312 having different values may give rise to multiple carrier codebook 312 having different properties. First and second example codebook embodiments are described herein below. Each code word in these two example codebook embodiments has a length of ten values (e.g., 10 bits), but code words may alternatively be of a different length.

For a first example codebook embodiment, a multiple carrier codebook 312 is described that may be implemented using one HS-DPCCH for DC-HSDPA HARQ acknowledgement signaling. The codebook may have the following example values for each of the noted code words:
    ACK/ACK=[1 1 1 1 1 1 0 1 1 0]
    NACK/DTX=[1 1 1 0 1 1 1 0 0 1]
    DTX/ACK=[1 1 0 1 0 0 1 0 1 0]
    DTX/NACK=[0 0 0 1 1 1 1 1 1 1]
    ACK/ACK=[1 0 0 0 0 1 1 1 0 0]
    ACK/NACK=[0 1 0 1 0 1 0 0 0 1]
    NACK/ACK=[1 0 0 0 1 0 0 0 1 1]
    NACK/NACK=[0 1 1 0 0 0 1 1 1 1].
This codebook has a minimum Hamming distance equal to 5.

With this first example codebook embodiment, two more code words that are identical to legacy PRE/POST code words may be added in order to also support PRE/POST functionality. Even with the addition of the legacy PRE/POST code words, the minimum Hamming distance can remain equal to 5. This first example codebook embodiment can achieve an appreciably better message error rate performance as compared to a codebook that is based on the existing 8 MIMO ACK/NACK/PRE/POST code words.

However, use of the first example codebook embodiment for dual carrier ACK/NACK signaling implies that a remote terminal will fall back to Release-5 (single carrier) ACK/NACK signaling when an HS-SCCH order deactivating DC-HSDPA operation is received. As a result, problems may arise when a remote terminal misses such an HS-SCCH order and therefore keeps using a DC-HSDPA HARQ acknowledgement codebook, while the wireless network node starts decoding received code words using a (single carrier) Release-5 codebook.

The Release-5 single carrier codebook contains the following two code words for the ACK single carrier indication and the NACK single carrier indication:
    ACK=[1 1 1 1 1 1 1 1 1 1]
    NACK=[0 0 0 0 0 0 0 0 0 0].
The acknowledgement signaling may be preceded by PRE and POST transitional operation indicators, as represented in state diagram 200 (of FIG. 2). By way of example, the PRE and POST code words may have the following two (legacy) values:
    PRE=[0 0 1 0 0 1 0 0 1 0]
    POST=[0 1 0 0 1 0 0 1 0 0].

To address the potential ambiguity (e.g., possible codebook mismatches between a remote terminal and a wireless network node) when a remote terminal fails to detect an HS-SCCH order, a codebook for the MC-HSDPA HARQ acknowledgement signaling may contain the single-carrier codebook as a sub-codebook or subset thereof. A second example codebook embodiment, which is described below, includes a single carrier codebook as a sub-codebook or subset of a multiple carrier codebook.

For the example presented below, the Hamming distance between each of the code word pairs is also enhanced so as to achieve a minimum Hamming distance of 4. More specifically, for a second example codebook embodiment, a multiple carrier codebook 312 is described that may be implemented using one HS-DPCCH for DC-HSDPA HARQ acknowledgement signaling. The codebook may have the following example values for each of the noted code words:

ACK/DTX=[1 1 1 1 1 1 1 1 1 1]
NACK/DTX=[0 0 0 0 0 0 0 0 0 0]
DTX/ACK=[1 1 1 1 1 0 0 0 0 0]
DTX/NACK=[0 0 0 0 0 1 1 1 1 1]
NACK/ACK=[1 1 0 0 1 1 0 0 1 1]
ACK/NACK=[0 0 1 1 0 0 1 1 0 0]
ACK/ACK=[1 0 1 0 1 0 1 0 1 0]
NACK/NACK=[0 1 0 1 0 1 0 1 0 1].

The minimum Hamming distance of this example codebook is 4.

Furthermore, this second example codebook embodiment may be augmented with the preamble (PRE) and postamble (POST) legacy code words as defined in Releases 5, 6, and 7. These legacy values for PRE and POST code words are as follows:

PRE=[0 0 1 0 0 1 0 0 1 0]
POST=[0 1 0 0 1 0 0 1 0 0].

With this second example codebook embodiment, when a remote terminal misses an order to cease multiple carrier operation (e.g., misses an HS-SCCH order) and remains in multiple carrier operation (e.g., remains in DC-HSDPA operation), it will signal an ACK/DTX code word indication or a NACK/DTX code word indication when it acknowledges receipt of HS-DSCH data. Because these two code words are the same as the ACK and NACK code words for single carrier (including single cell) signaling, there is no ambiguity problem at the wireless network node.

Moreover, given the codebook configuration of the second example codebook embodiment, messages having opposite meanings are assigned the largest (pair-wise) code word separation. For example, messages DTX/ACK and DTX/NACK have opposite meaning. The messages ACK/DTX and NACK/DTX also have opposite meaning. Additionally, the messages ACK/ACK and NACK/NACK have (double) opposite meaning. The messages ACK/NACK and NACK/ACK also have (double) opposite meaning. It can be seen that the proposed codebook has a Hamming distance of 10 for each pair of the above opposite-meaning cases.

Code word remapping (e.g., changing the definition of a code word), bit permutation, bit-wise masking, combinations thereof, and so forth result in codebooks having the enumerated properties. Consequently, codebooks that can be obtained through one or more of these and/or similar or analogous operations (e.g., when starting from a codebook as described herein) comprise equivalent code books. Example implementations of these operations are provided below.

As a first example, one can remap the definition of two or more pairs of code words. For instance, these two code words [1 1 0 0 1 1 0 0 1 1] and [0 0 1 1 0 0 1 1 0 0] (for NACK/ACK and ACK/NACK) may be switched to produce the following equivalent codebook:

ACK/DTX=[1 1 1 1 1 1 1 1 1 1]
NACK/DTX=[0 0 0 0 0 0 0 0 0 0]
DTX/ACK=[1 1 1 1 1 0 0 0 0 0]
DTX/NACK=[0 0 0 0 0 1 1 1 1 1]
NACK/ACK=[0 0 1 1 0 0 1 1 0 0]
ACK/NACK=[1 1 0 0 1 1 0 0 1 1]
ACK/ACK=[1 0 1 0 1 0 1 0 1 0]
NACK/NACK=[0 1 0 1 0 1 0 1 0 1]
PRE=[0 0 1 0 0 1 0 0 1 0]
POST=[0 1 0 0 1 0 0 1 0 0].

This code word remapping does not, however, change the basic code properties, such as the minimum Hamming distance of 4, of the code book. Also, the (pair-wise) maximum Hamming distance of 10 is preserved between code pairs having opposite meanings. In other words, the Hamming distance of 10 is preserved between code pairs DTX/ACK and DTX/NACK, between code pairs ACK/DTX and NACK/DTX, between code pairs ACK/NACK and NACK/ACK, and between code pairs ACK/ACK and NACK/NACK.

As another example, permuting the columns in an "original" code book does not change the basic code properties. For instance, switching the first and last columns of the "original" second example codebook embodiment results in an equivalent code book as follows:

ACK/DTX=[1 1 1 1 1 1 1 1 1 1]
NACK/DTX=[0 0 0 0 0 0 0 0 0 0]
DTX/ACK=[0 1 1 1 1 0 0 0 0 1]
DTX/NACK=[1 0 0 0 0 1 1 1 1 0]
NACK/ACK=[1 1 0 0 1 1 0 0 1 1]
ACK/NACK=[0 0 1 1 0 0 1 1 0 0]
ACK/ACK=[0 0 1 0 1 0 1 0 1 1]
NACK/NACK=[1 1 0 1 0 1 0 1 0 0]
PRE=[0 0 1 0 0 1 0 0 1 0]
POST=[0 1 0 0 1 0 0 1 0 0].

This bit-permuted codebook preserves the minimum Hamming distance of 4 for the code book. Also, the Hamming distance of 10 is preserved between code pairs DTX/ACK and DTX/NACK, between code pairs ACK/DTX and NACK/DTX, between code pairs ACK/NACK and NACK/ACK, and between code pairs ACK/ACK and NACK/NACK.

As yet another example, applying a common mask to the "original" second example codebook embodiment does not change the basic code properties. For instance, one can apply a common mask of [1 0 0 1 0 0 1 0 0 0] to each of the code words in the "original" code book to produce the following equivalent code book:

ACK/DTX=[0 1 1 0 1 1 0 1 1 1]
NACK/DTX=[1 0 0 1 0 0 1 0 0 0]
DTX/ACK=[0 1 1 0 1 0 1 0 0 0]
DTX/NACK=[1 0 0 1 0 1 0 1 1 1]
NACK/ACK=[0 1 0 1 1 1 1 0 1 1]
ACK/NACK=[1 0 1 0 0 0 0 1 0 0]
ACK/ACK=[0 0 1 1 1 0 0 0 1 0]
NACK/NACK=[1 1 0 0 0 1 1 1 0 1]
PRE=[1 0 1 1 0 1 1 0 1 0]
POST=[1 1 0 1 1 0 1 1 0 0].

This code book resulting from application of a common mask preserves the minimum Hamming distance of 4 for the code book. Also, the Hamming distance of 10 is preserved between code pairs DTX/ACK and DTX/NACK, between code pairs ACK/DTX and NACK/DTX, between code pairs ACK/NACK and NACK/ACK, and between code pairs ACK/ACK and NACK/NACK.

Figure 5:
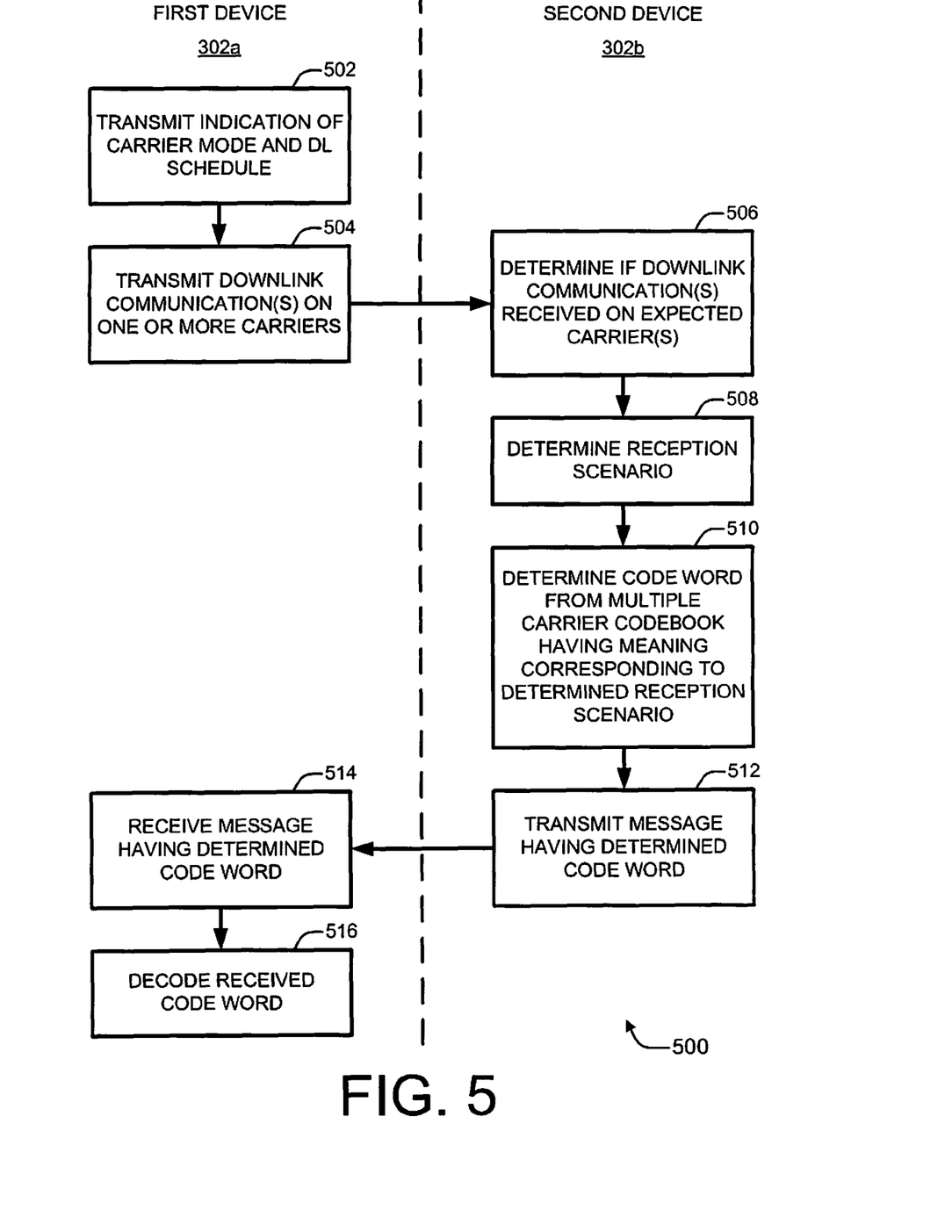
FIG. 5 is a flow diagram of an example general method for multiple carrier acknowledgment signaling.

FIG. 5 is a flow diagram 500 of an example general method for multiple carrier acknowledgment signaling. As illustrated, flow diagram 500 includes eight blocks 502-516. Flow diagram 500 may be implemented by two communication devices, such as a first device 302a and a second device 302b (of FIG. 3). In an example embodiment, first device 302a implements steps 502, 504, 514, and 516 as a wireless network node 102. Second device 302b implements steps 506-512 as a remote terminal 104.

The steps of flow diagram 500 may be effectuated with processor-executable instructions. Processor-executable instructions may be embodied as hardware, firmware, software, fixed logic circuitry, combinations thereof, and so forth. Example operational implementations of processor-executable instructions include, but are not limited to, a memory coupled to a processor, an application-specific integrated circuit (ASIC), a digital signal processor and associated code, some combination thereof, and so forth.

In an example embodiment, flow diagram 500 depicts a method for using a multiple carrier codebook 312 to implement acknowledgment signaling in a multiple carrier environment. Although particular example elements from other FIGS. are referenced to describe the steps of FIG. 5, the steps may alternatively be performed with other elements.

At step 502, an indication of carrier mode and a downlink schedule is transmitted. For example, wireless network node 102 may transmit indication(s) of a carrier mode and a downlink schedule to remote terminal 104a using transmitter 304a. The carrier mode may be, for instance, a single-carrier mode or a multiple-carrier mode (e.g., a dual carrier mode). A downlink schedule typically informs the remote terminal of a bandwidth assignment block (e.g., frequencies and/or time slot(s)).

At step 504, downlink communication(s) are transmitted on one or more carriers. For example, wireless network node 102 may transmit using transmitter 304a downlink communication(s) 106 on one or more carriers to remote terminal 104a in accordance with the indicated carrier mode and downlink schedule.

Remote terminal 104a receives or at least attempts to receive downlink communications 106 from wireless network node 102 using receiver 306b. At step 506, it is determined if downlink communication(s) are received on expected carrier(s). For example, a communication confirmation unit 308b of remote terminal 104a may determine if downlink communication(s) 106 are received on the carrier(s) that are expected based on the indicated carrier mode and downlink schedule.

At step 508, a reception scenario is determined. For example, in a dual carrier situation, communication confirmation unit 308b of remote terminal 104a may determine the reception scenario. The reception scenario corresponds to whether a communication was or was not correctly received on the expected carrier(s) and whether a communication was expected on the carrier(s). Thus, determining the reception scenario determines whether an ACK, NACK, DTX, etc. indication is appropriate for each of the assigned carrier(s). For a specific example, if a communication is expected on both a first and a second carrier, and if one is correctly received only on the first carrier, the reception scenario corresponds to an ACK for the first carrier and a NACK for the second carrier.

At step 510, from a multiple carrier codebook, a code word is determined that has a meaning corresponding to the determined reception scenario. For example, from a multiple carrier codebook 312 that is stored in a memory of remote terminal 104a, communication confirmation unit 308b of remote terminal 104a may determine a code word having a meaning corresponding to the determined reception scenario. Continuing with the specific example in a dual carrier context, remote terminal 104a determines the value of the code word 402f in dual carrier codebook 312-2 that corresponds to the ACK/NACK meaning.

At step 512, a message having the determined code word is transmitted. For example, an uplink response message 108 having the determined code word 402 may be transmitted using transmitter 304b from remote terminal 104a to wireless network node 102. At step 514, a message having the determined code word is received. For example, uplink response message 108 having the determined code word 402 may be received from remote terminal 104a at wireless network node 102 using receiver 306a.

At step 516, the received code word is decoded. For example, using a copy of multiple carrier codebook 312 that is stored in a memory of wireless network node 102, communication confirmation unit 308a of wireless network node 102 may decode the received code word 402. The decoding transforms or extracts the acknowledgment meaning from the value of the received code word 402. Continuing with the specific example, communication confirmation unit 308a of wireless network node 102 decodes the value of the received code word 402f to extract the intended ACK/NACK meaning that acknowledges the reception scenario on the first and second carriers.

Figure 6A:
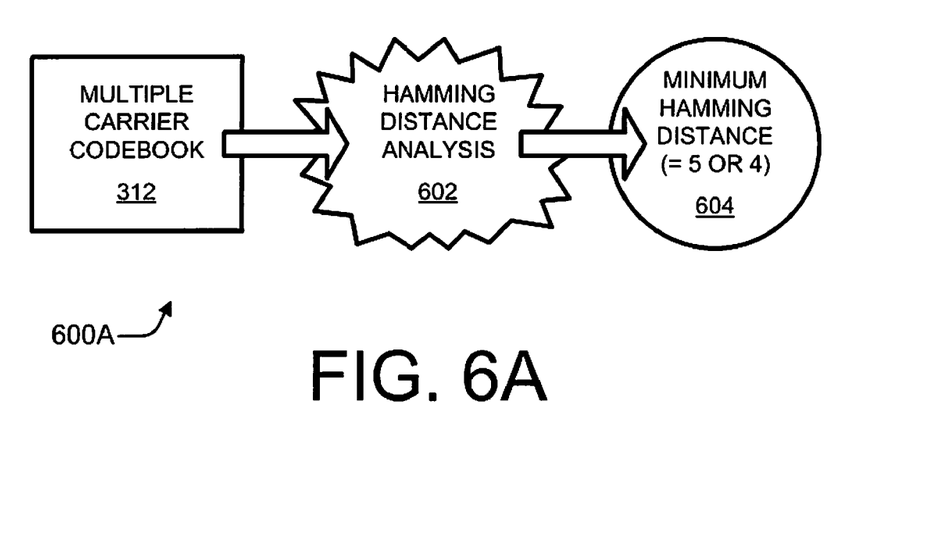
FIG. 6A is a block diagram that depicts a Hamming distance analysis that is performed on an example multiple carrier codebook.

FIG. 6A is a block diagram 600A that depicts a Hamming distance analysis 602 that is performed on an example multiple carrier codebook 312. As illustrated, block diagram 600A includes multiple carrier codebook 312, Hamming distance analysis 602, and a minimum Hamming distance 604. Generally, a Hamming distance analysis 602 is applied to a multiple carrier codebook 312. The result of the analysis is a minimum Hamming distance 604.

As described herein above, a multiple carrier codebook 312 in accordance with the first example codebook embodiment achieves a minimum Hamming distance 604 equal to five (5). Equivalent manipulations of this codebook likewise maintain the minimum Hamming distance of five. A multiple carrier codebook 312 in accordance with the second example codebook embodiment achieves a minimum Hamming distance 604 equal to four (4). Equivalent manipulations of this codebook likewise maintain the minimum Hamming distance of four.

Figure 6B:
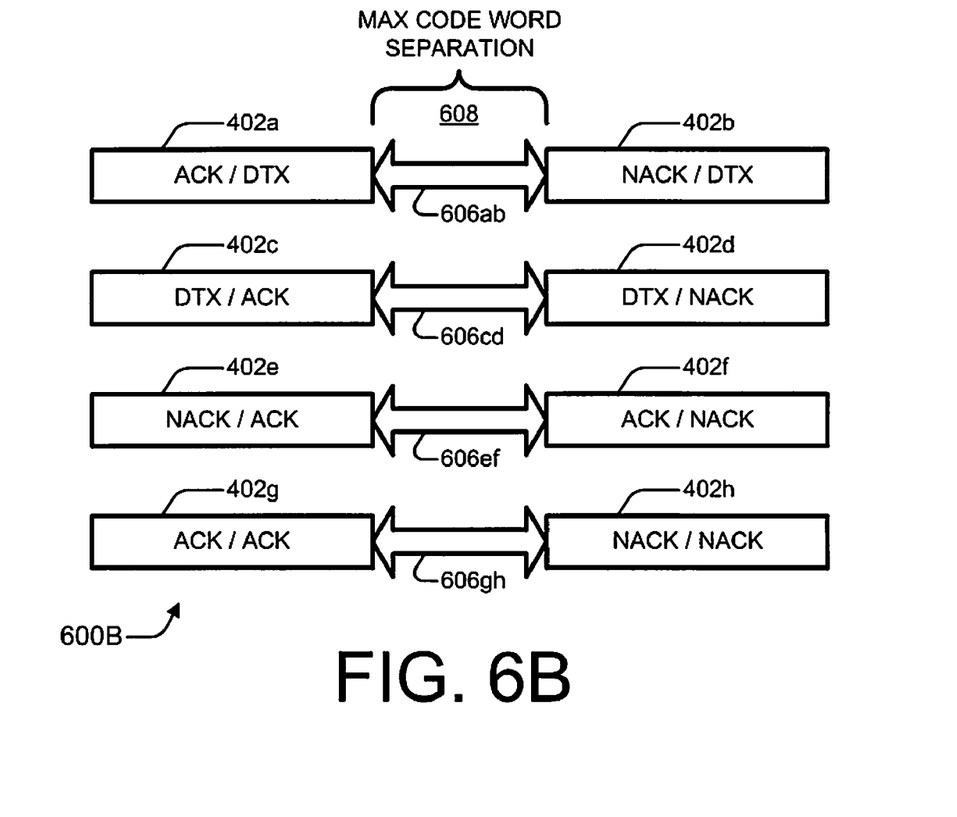
FIG. 6B is a block diagram that depicts example codeword pairs having opposite meanings.

FIG. 6B is a block diagram 600B that depicts example code word pairs 606 having opposite meanings. As illustrated, block diagram 600B includes four code word pairs 606, eight code words 402, and a maximum code word separation indication 608. Each code word pair 606 includes two code words 402 that have opposite meanings.

Code word pair 606ab includes code word 402a (ACK/DTX) and code word 402b (NACK/DTX). Code word pair 606cd includes code word 402c (DTX/ACK) and code word 402d (DTX/NACK). Code word pair 606ef includes code word 402e (NACK/ACK) and code word 402f (ACK/NACK). Code word pair 606gh includes code word 402g (ACK/ACK) and code word 402h (NACK/NACK).

For at least the second example codebook embodiment, the code word separation is configured to be a maximum codeword separation 608 between any two code words 402 of a code word pair 606 in which the included code words have opposite meanings. For example, there is a maximum code word separation 608 between code words 402a and 402b. Similarly, there is a maximum code word separation 608 between code words 402e and 402f. For codebooks having code words 402 of length ten, the maximum code word separation 608 is ten.

With the second example codebook embodiment, a remote terminal is enabled to signal MC-HSDPA HARQ affirmative acknowledgements (or negative acknowledgements) using a codebook that differs from a single carrier codebook for the same system. The multiple carrier (including multiple cell) codebook contains the codebook used for single carrier (including single cell) HARQ acknowledgement signaling as a sub-codebook thereof. Furthermore, the pair-wise Hamming distance of the new codebook is enhanced under the sub-codebook constraints. This approach can be extended to cover the case of MIMO extension to multiple carrier (or multiple cell) operations.

In another example embodiment, with respect to CQI reporting in a dual carrier environment, a remote terminal is to use the DC-HSDPA HS-DPCCH format regardless of whether or not a HS-SCCH order deactivating the DC-HSDPA operation has been received. With such an embodiment, there will be superfluous bits for a second CQI field. These superfluous bits in the second CQI field may be used in any of a number of different ways.

Example uses of the superfluous bits of the second CQI field are described as follows. First, the CQI for the second carrier can be measured and reported even though the wireless network node will not currently schedule the remote terminal on the second carrier. These reported measurements may nevertheless be used by the wireless network node. For instance, a wireless network node may determine whether or not it is appropriate to reactivate the DC-HSDPA operation.

Second, the CQI for the first carrier may be reported twice in order to achieve a kind of repetition coding of the CQI. This repetition coding may improve the uplink coverage for the CQI information. Third, an un-assigned/unused CQI value (e.g., currently the value 31 is not used) may be reported so as to indicate to the wireless network node that the remote terminal assumes that the DC-HSDPA operation is currently deactivated. Alternatively, two (10, 5) codes may be used for coding the CQIs (i.e., one for each carrier/cell).

Certain implementations may involve a combination of the DC-HSDPA feature and the MIMO HSDPA feature. In such implementations, a new format may be utilized. For an example embodiment of such a format, the information corresponding to the first MIMO stream may be mapped to a first HS-DPCCH code, and the information corresponding to the second MIMO stream may be mapped to a second HS-DPCCH code. The first HS-DPCCH code may be similar to the DC-HSDPA HS-DPCCH format described above. The second HS-DPCCH code may be transmitted in parallel with the first HS-DPCCH code.

Figure 7:
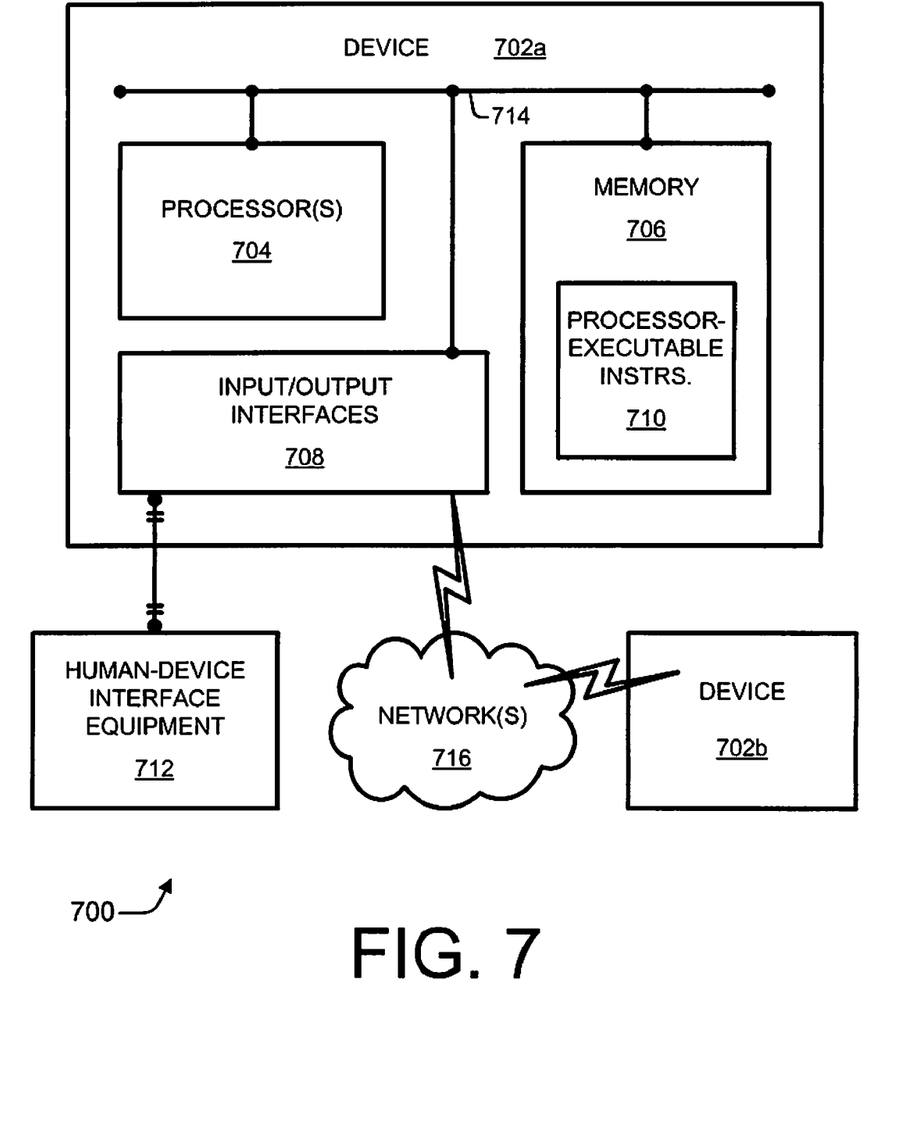
FIG. 7 is a block diagram of example devices that may be used to implement embodiments for multiple carrier acknowledgment signaling.

FIG. 7 is a block diagram 700 of example devices 702 that may be used to implement embodiments for multiple carrier acknowledgment signaling. As illustrated, block diagram 700 includes two devices 702a and 702b, human-device interface equipment 712, and one or more networks 716. As explicitly shown with device 702a, each device 702 may include at least one processor 704, one or more memories 706, one or more input/output interfaces 708, and at least one interconnection 714. Memory 706 may include processor-executable instructions 710. Network(s) 716 may be, by way of example but not limitation, an Internet, an intranet, an Ethernet, a public network, a private network, a cable network, a digital subscriber line (DSL) network, a telephone network, a wired network, a wireless network, some combination thereof, and so forth. Device 702a and device 702b may communicate over network(s) 716.

For example embodiments, device 702 may represent any processing-capable device. Processor 704 may be implemented using any applicable processing-capable technology, and one may be realized as a general-purpose or a special-purpose processor. Examples include, but are not limited to, a central processing unit (CPU), a digital signal processor (DSP), a microprocessor, some combination thereof, and so forth. Memory 706 may be any available memory that is included as part of and/or is accessible by device 702. It includes volatile and non-volatile memory, removable and non-removable memory, hard-coded logic, combinations thereof, and so forth.

Interconnection 714 interconnects the components of device 702. Interconnection 714 may be realized as a bus or other connection mechanism and may directly or indirectly interconnect various components. I/O interfaces 708 may include (i) a network interface for monitoring and/or communicating across network 716, (ii) a display device interface for displaying information on a display screen, (iii) one or more human-device interfaces, and so forth. Example network interfaces include, but are not limited to, a radio or transceiver (e.g., a transmitter and/or a receiver), a modem, a network card, some combination thereof, and so forth. Human-device interface equipment 712 may be integrated with or discrete from device 702.

Generally, processor 704 is capable of executing, performing, and/or otherwise effectuating processor-executable instructions, such as processor-executable instructions 710. Memory 706 is comprised of one or more processor-accessible memories. In other words, memory 706 may include processor-executable instructions 710 that are executable by processor 704 to effectuate the performance of functions by device 702. Processor-executable instructions 710 may be embodied as software, firmware, hardware, fixed logic circuitry, some combination thereof, and so forth. Processor 704 and processor-executable instructions 710 of memory 706 may be realized separately (e.g., as a DSP executing code) or integrated (e.g., as part of an application-specific integrated circuit (ASIC)).

In example implementations, one device 702 may comprise a first device 302a (e.g., a wireless network node 102), and another device 702 may comprise a second device 302b (e.g., a remote terminal 104) (of FIGS. 1 and 3). Processor-executable instructions 710 may comprise, for example, the components and/or units of FIGS. 3, 4, 6A, and 6B (e.g., a communication confirmation unit 308, a multiple carrier codebook 312, etc.). When processor-executable instructions 710 are executed by processor 704, the functions that are described herein may be effectuated. Example functions include, but are not limited to, those that are illustrated by flow diagram 500 (of FIG. 5) and those that are enabled by the example multiple carrier codebooks that are described herein above, as well as those that are embodied by the other features that are described herein.

Different embodiment(s) of the invention can offer one or more advantages. Generally, certain embodiments achieve an enhanced minimum Hamming distance for a codebook having code words that jointly encode ACK/NACK signaling for multiple carriers. Another advantage of certain embodiments is that PRE and POST operations may be supported (e.g., by including a preamble code word and a postamble code word that are compatible with one or more previous releases of a wireless standard). More specifically, for a first example codebook embodiment, a multiple carrier codebook having ten total code words achieves a minimum Hamming distance of five across the ten total code words, with five being the largest possible minimum Hamming distance for any codebook having 10 code words of length 10.

For a second example codebook embodiment, a multiple carrier codebook having eight code words achieves a minimum Hamming distance of four between any two code word pairs (e.g., excluding preamble and postamble code words). Furthermore, another advantage of these embodiments is that codebook ambiguity may be avoided when a remote terminal fails to detect an HS-SCCH order because a multiple carrier codebook can be configured to include a single carrier codebook as a sub-codebook or subset thereof. Still yet another advantage of certain embodiments is that a largest code word separation for messages having opposite meanings may be achieved.

The devices, features, functions, methods, steps, schemes, data structures, procedures, components, etc. of FIGS. 1-7 are illustrated in diagrams that are divided into multiple blocks and other elements. However, the order, interconnections, interrelationships, layout, etc. in which FIGS. 1-7 are described and/or shown are not intended to be construed as limiting, for any number of the blocks and/or other elements may be modified, combined, rearranged, augmented, omitted, etc. in any manner to implement one or more systems, methods, devices, memory, apparatuses, arrangements, etc. for multiple carrier acknowledgment signaling.

Although multiple embodiments of the present invention have been illustrated in the accompanying Drawings and described in the foregoing Detailed Description, it should be understood that the invention is not limited to the disclosed embodiments, for it is also capable of numerous rearrangements, modifications and substitutions without departing from the scope of the invention as set forth and defined by the following claims.

What is claimed is:

1. A method in a remote terminal for acknowledgment uplink signaling in a multiple-carrier mode, the method comprising the steps of:
   determining a code word that jointly encodes acknowledgment signaling for at least two carriers from a multiple carrier codebook that is stored in at least one memory of the remote terminal; the multiple carrier codebook including at least eight code words that are defined to have a single carrier codebook as a sub-codebook of the multiple carrier codebook, each code word of the eight code words having a length of ten; the multiple carrier codebook achieving a minimum Hamming distance of four among the at least eight code words; and,
   transmitting from the remote terminal to a wireless network node an uplink signaling message that includes the determined code word.

2. The method as recited in claim 1, wherein the multiple-carrier mode comprises a dual-carrier mode; and wherein the at least eight code words have the following eight meanings: Acknowledgment, ACK/Discontinuous Transmission, DTX; Negative Acknowledgment, NACK/DTX; DTX/ACK; DTX/NACK; NACK/ACK; ACK/NACK; ACK/ACK; and NACK/NACK.

3. The method as recited in claim 2, wherein the at least two carriers comprise a first carrier and a second carrier; and wherein the ACK/DTX corresponds to an affirmative acknowledgment for the first carrier and no reception for the second carrier, the NACK/DTX corresponds to a negative acknowledgment for the first carrier and no reception for the second carrier, the DTX/ACK corresponds to no reception for the first carrier and an affirmative acknowledgment for the second carrier, the DTX/NACK corresponds to no reception for the first carrier and a negative acknowledgment for the second carrier, the NACK/ACK corresponds to a negative acknowledgment for the first carrier and an affirmative acknowledgment for the second carrier, the ACK/NACK corresponds to an affirmative acknowledgment for the first carrier and a negative acknowledgment for the second carrier, the ACK/ACK corresponds to an affirmative acknowledgment for the first carrier and an affirmative acknowledgment for the second carrier, and the NACK/NACK corresponds to a negative acknowledgment for the first carrier and a negative acknowledgment for the second carrier.

4. The method as recited in claim 1, wherein the multiple carrier codebook maximizes a pair-wise Hamming distance property for code words having opposite meanings.

5. The method as recited in claim 4, wherein the multiple-carrier mode comprises a dual-carrier mode; and wherein the following code word pairs from the multiple carrier codebook have opposite meanings: Discontinuous Transmission, DTX/Acknowledgment, ACK, and DTX/Negative Acknowledgment, NACK; ACK/DTX and NACK/DTX; ACK/ACK and NACK/NACK; and ACK/NACK and NACK/ACK.

6. The method as recited in claim 1, wherein the multiple carrier codebook further includes a preamble code word and a postamble code word that are compatible with at least one legacy single-carrier version of preamble and postamble code words.

7. The method as recited in claim 1, wherein the multiple carrier codebook, having the single carrier codebook as a sub-codebook thereof, enables accurate uplink signaling even when a device receiving the uplink signaling message and a device transmitting the uplink signaling message are mismatched with regard to the single carrier codebook versus the multiple carrier codebook.

8. The method as recited in claim 1, wherein the sub-codebook of the multiple carrier codebook that corresponds to the single carrier codebook comprises (i) an Acknowledgment, ACK/Discontinuous Transmission, DTX code word that corresponds to an ACK code word and (ii) a Negative Acknowledgment, NACK/DTX code word that corresponds to a NACK code word.

9. The method as recited in claim 1, wherein the step of transmitting an uplink signaling message comprises the step of transmitting the uplink signaling message that includes the determined code word on a high-speed dedicated physical control channel, HS-DPCCH.

10. The method as recited in claim 1, further comprising the step of transmitting at least a first and a second channel quality indicator, CQI, field when multiple-carrier mode is deactivated.

11. The method as recited in claim 10, wherein the second CQI field comprises a CQI for a second carrier.

12. The method as recited in claim 10, wherein the first CQI field and the second CQI field both comprise a CQI for a first carrier.

13. The method as recited in claim 10, wherein the second CQI field comprises a value to indicate that the multiple-carrier mode is deactivated.

14. The method as recited in claim 1, further comprising the steps of:
   mapping information corresponding to a first multiple-input multiple-output, MIMO, stream to a code word from the multiple carrier codebook for a first code word message; and,
   mapping information corresponding to a second MIMO stream to a code word from the multiple carrier codebook for a second code word message;

wherein the step of transmitting an uplink signaling message comprises the step of transmitting the first code word message in parallel with the second code word message.

15. The method as recited in claim 1, wherein the automatic repeat request uplink signaling comprises hybrid automatic repeat request, HARQ, uplink signaling.

16. The method as recited in claim 1, wherein the multiple-carrier mode comprises a multiple-cell mode in which a first carrier of the at least two carriers is associated with a first cell and a second carrier of the at least two carriers is associated with a second cell.

17. The method as recited in claim 1, further comprising the steps of:
   determining if one or more downlink communications are received on one or more expected carriers; and,
   determining a reception scenario based on the one or more downlink communications and the one or more expected carriers;
   wherein the step of determining a code word comprises the step of determining the code word from the multiple carrier codebook that has a meaning corresponding to the determined reception scenario.

18. A remote terminal adapted to perform acknowledgment uplink signaling in a multiple-carrier mode, the remote terminal comprising:
   at least one memory storing a multiple carrier codebook; the multiple carrier codebook including at least eight code words that are defined to have a single carrier codebook as a sub-codebook of the multiple carrier codebook, each code word of the eight code words having a length of ten; the multiple carrier codebook achieving a minimum Hamming distance of four among the at least eight code words; and
   one or more processors to:
   determine a code word that jointly encodes acknowledgment signaling for at least two carriers from the multiple carrier codebook; and,
   transmit from the remote terminal to a wireless network node an uplink signaling message that includes the determined code word.

19. The remote terminal as recited in claim 18, wherein the multiple-carrier mode comprises a dual-carrier mode; and wherein the at least eight code words have the following eight meanings: Acknowledgment, ACK/Discontinuous Transmission, DTX; Negative Acknowledgment, NACK/DTX; DTX/ACK; DTX/NACK; NACK/ACK; ACK/NACK; ACK/ACK; and NACK/NACK.

20. The remote terminal as recited in claim 18, wherein the multiple carrier codebook maximizes a pair-wise Hamming distance property for code words having opposite meanings.

21. The remote terminal as recited in claim 20, wherein the multiple-carrier mode comprises a dual-carrier mode; and wherein the following code word pairs from the multiple carrier codebook have opposite meanings: Discontinuous Transmission, DTX/Acknowledgment, ACK and DTX/Negative Acknowledgment, NACK; ACK/DTX and NACK/DTX; ACK/ACK and NACK/NACK; and ACK/NACK and NACK/ACK.

22. The remote terminal as recited in claim 18, wherein the multiple carrier codebook further includes a preamble code word and a postamble code word that are compatible with at least one legacy single-carrier version of preamble and postamble code words.

23. The remote terminal as recited in claim 18, wherein the multiple-carrier mode comprises a multiple-cell mode in which a first carrier of the at least two carriers is associated with a first cell and a second carrier of the at least two carriers is associated with a second cell.

24. A method in a wireless network node for acknowledgment uplink signaling in a multiple-carrier mode, the method comprising the steps of:
   receiving from a remote terminal at the wireless network node an uplink signaling message that includes a code word that jointly encodes acknowledgment signaling for at least two carriers; and,
   decoding the code word using a multiple carrier codebook that is stored in at least one memory of the wireless network node; the multiple carrier codebook including at least eight code words that are defined to have a single carrier codebook as a sub-codebook of the multiple carrier codebook, each code word of the eight code words having a length of ten; the multiple carrier codebook achieving a minimum Hamming distance of four among the at least eight code words.

25. A wireless network node adapted to perform acknowledgment uplink signaling in a multiple-carrier mode, the wireless network node comprising:
   at least one memory storing a multiple carrier codebook; the multiple carrier codebook including at least eight code words that are defined to have a single carrier codebook as a sub-codebook of the multiple carrier codebook, each code word of the eight code words having a length of ten; the multiple carrier codebook achieving a minimum Hamming distance of four among the at least eight code words; and
   one or more processors to:
   receive from a remote terminal at the wireless network node an uplink signaling message that includes a code word that jointly encodes acknowledgment signaling for at least two carriers; and,
   decode the code word using a multiple carrier codebook.

26. A method in a remote terminal for acknowledgment uplink signaling in a multiple-carrier mode, the method comprising the steps of:
   determining a code word that jointly encodes acknowledgment signaling for at least two carriers from a multiple carrier codebook that is stored in at least one memory of the remote terminal; the multiple carrier codebook including at least eight code words plus a preamble code word and a postamble code word, the preamble code word and the postamble code word compatible with at least one legacy single-carrier version of preamble and postamble code words, each code word of the eight code words having a length of ten; the multiple carrier codebook achieving a minimum Hamming distance of five across the eight code words and the preamble and postamble code words; and,
   transmitting from the remote terminal to a wireless network node an uplink signaling message that includes the determined code word.

* * * * *